US006093131A

United States Patent [19]

Rohs

[11] Patent Number: 6,093,131

[45] **Date of Patent: *Jul. 25, 2000**

[54] FRICTION CONE GEARING

[76] Inventor: Ulrich Rohs, Roonstrasse 11, 52351 Düren, Germany

[ * ] Notice: This patent is subject to a terminal disclaimer.

[21] Appl. No.: 09/298,585

[22] Filed: Apr. 23, 1999

Related U.S. Application Data

[62] Division of application No. 08/859,735, May 21, 1997, Pat. No. 5,924,953.

[51] Int. Cl.$^{7}$ .................................................. F16H 15/16

[52] U.S. Cl. .............................................. 476/53; 476/52

[58] Field of Search .................................. 476/52, 5, 7, 8

[56] References Cited

U.S. PATENT DOCUMENTS

| | | | |
|---|---|---|---|
| 760,460 | 5/1904 | Leighton | 476/53 |
| 1,637,664 | 8/1927 | Stoeckicht | 476/53 |
| 1,709,346 | 4/1929 | Garrard | 476/53 |
| 2,178,859 | 11/1939 | Jett et al. . | |
| 2,205,031 | 6/1940 | Bugden | 74/192 |
| 2,583,790 | 1/1952 | Mikina . | |
| 2,807,171 | 9/1957 | Wychoff | 476/53 |
| 2,865,213 | 12/1958 | Pernollet | 476/53 |
| 3,257,857 | 6/1966 | Davin et al. | 74/192 |
| 3,698,255 | 10/1972 | Schott | 74/193 |
| 4,393,964 | 7/1983 | Kemper . | |
| 5,208,102 | 5/1993 | Schulz et al. | 428/336 |
| 5,593,234 | 1/1997 | Liston | 384/492 |
| 5,601,509 | 2/1997 | Munoz | 476/53 |
| 5,607,370 | 3/1997 | Maslow et al. | 475/196 |

FOREIGN PATENT DOCUMENTS

| | | |
|---|---|---|
| 0 394 005 A1 | 10/1990 | European Pat. Off. . |
| 0 657 663 A1 | 6/1995 | European Pat. Off. . |
| 1144582 | 10/1957 | France . |
| 1 005 335 | 3/1957 | Germany . |
| 3835052 A1 | 5/1989 | Germany . |
| 195 42 726 A1 | 5/1997 | Germany . |
| 147 713 | 6/1931 | Switzerland . |
| 298676 | 11/1928 | United Kingdom . |
| 1 296 827 | 11/1972 | United Kingdom . |

*Primary Examiner*—David M. Fenstermacher
*Attorney, Agent, or Firm*—Henry M. Feiereisen

[57] ABSTRACT

A friction cone gearing assembly for transmitting power from a driving unit to a driven unit includes a housing, a friction cone gearing comprised of first and second bevel wheels rotatable about parallel rotational axes and having same taper angles, and a friction ring operatively engaged with the bevel wheels and encircling one of the bevel wheels, with the friction ring being guided along a generatrix of both bevel wheels, whereby the friction cone gearing is so positioned in a compartment of the housing as to be separated from the driving unit and driven unit.

12 Claims, 5 Drawing Sheets

FRICTION CONE GEARING

CROSS-REFERENCES TO RELATED APPLICATIONS

This application is a division of prior filed application Appl. No. 08/859,735, filed May 21, 1997 now U.S. Pat. No. 5,924,953.

BACKGROUND OF THE INVENTION

The present invention refers to a friction cone gearing for transmitting power from a driving unit to a driven unit, and in particular to a friction cone gearing of a type having two bevel wheels mounted on parallel shafts for rotation in opposite directions and defined by a same taper angle, and a friction ring clamped between the bevel wheels and encircling one of the bevel wheels, with the friction ring being guided along the generatrix of both bevel wheels.

A friction cone gearing of this type is known from British Pat. No. 298,676, which describes the provision of a guide member held parallel to the shafts of the bevel wheels on a guide shaft for direct the friction ring along the bevel wheels, effecting a stepless adjustment of the transmission ratio of the friction cone gearing. The bevel wheels are supported in two opposite anti-friction bearings, with lubricant reducing friction in the area of the bearings of the bevel wheels and between the bevel wheels and the friction ring.

In order to effect a good power transmission from one bevel wheel via the friction ring to the other bevel wheel, various surface characteristics of the bevel wheels were proposed. In particular, rubber-like surfaces have proven especially effective in order to realize a good power transmission. These types of surfaces suffer, however, shortcomings as far as longevity is concerned as a result of their susceptibility to wear.

SUMMARY OF THE INVENTION

It is thus an object of the present invention to provide an improved friction cone gearing, obviating the afore-stated drawbacks.

In particular, it is an object of the present invention to provide an improved friction cone gearing with improved service life.

These objects and others which will become apparent hereinafter are attained in accordance with the present invention by providing a friction cone gearing assembly which includes a housing, a friction cone gearing comprised of two bevel wheels and a friction ring operatively engaged with the bevel wheels and circumscribing one of the bevel wheels, with the friction ring being guided along a generatrix of both bevel wheels, whereby the friction cone gearing is so positioned in a compartment of the housing as to be separated from the driving unit and/or driven unit.

According to another feature of the present invention, the bevel wheels are supported in the housing by bearings which are so located that the friction cone gearing is also separated from the bearings.

The present invention is based on the recognition that the area of the friction cone gearing has different needs as far as lubricant is concerned compared to the area of the bearings for the bevel wheels and the area of the driving and driven units. While the friction cone gearing requires a great value of friction between the interacting bevel wheels and friction ring, a low value of friction is desired in the area of the bearings and driving and driven units. The subdivision of the housing into compartments for accommodating the friction cone gearing separate from the bearings and the driving and driven units permits the application of two different lubricants and eliminates the need for rubber-like surfaces in the area of the friction cone gearing. Practice has shown that even polished steel surfaces or smooth ceramic surfaces can be used in conjunction with a suitable lubricant. The application of hard surfaces for the bevel wheels and the friction ring significantly increases the durability and service life of the gearing.

According to another feature of the present invention, the bearings of the bevel wheels are sealed against the friction cone gearing. The provision of seals in the transition between the bearings of the bevel wheels and the transmission zone of the friction cone gearing results already in different housing compartments that permit use of different lubricants.

Preferably, at least one of the components of the friction cone gearing, i.e. bevel wheels or friction ring, is coated by a layer a material such as hard metal or ceramics, e.g. titanium nitride, titanium carbon nitride and titanium aluminum nitride.

The friction cone gearing assembly according to the present invention is suitable in particular as gearbox of motor vehicles in conjunction with a hydraulic coupling and a gear selector mechanism for the change of traveling direction, for use in a front wheel drive or rear wheel drive.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
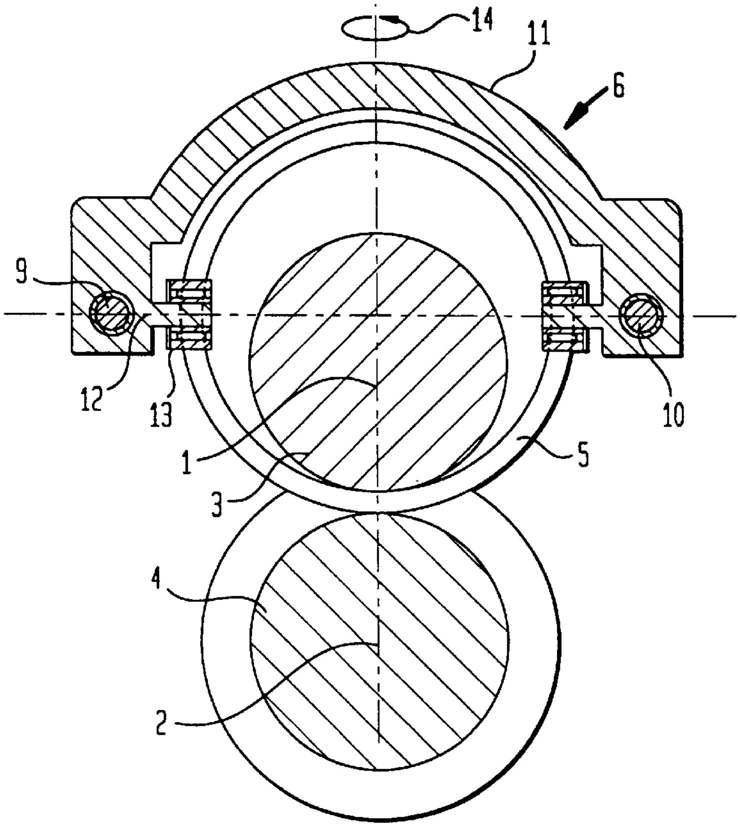
FIG. 1 is a schematic, partially sectional view of a friction cone gearing according to the present invention, taken along the line I—I in FIG. 2.
Figure 2:
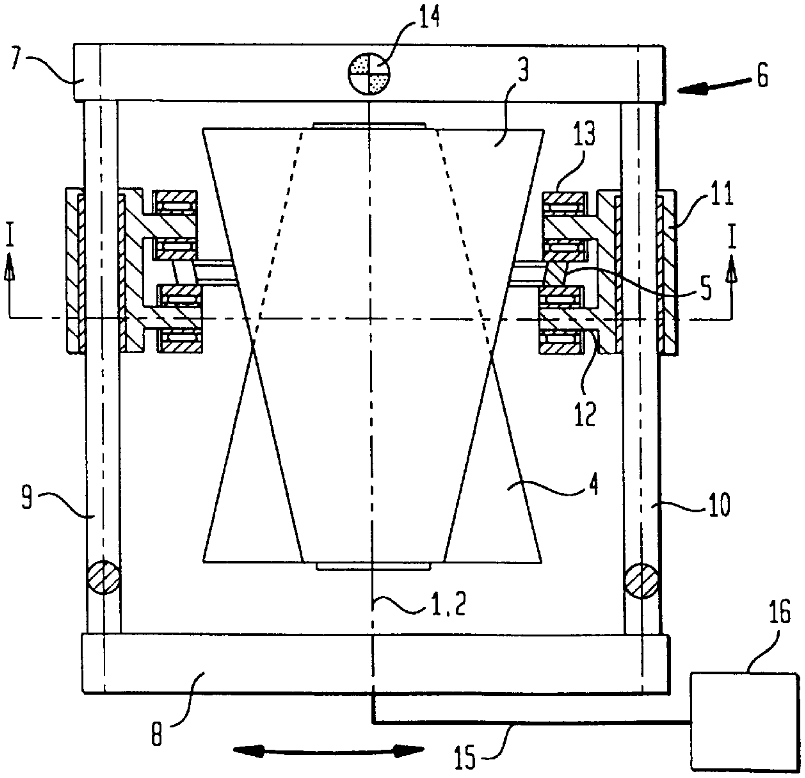
FIG. 2 is a top view of the friction cone gearing of FIG. 1.
Figure 3:
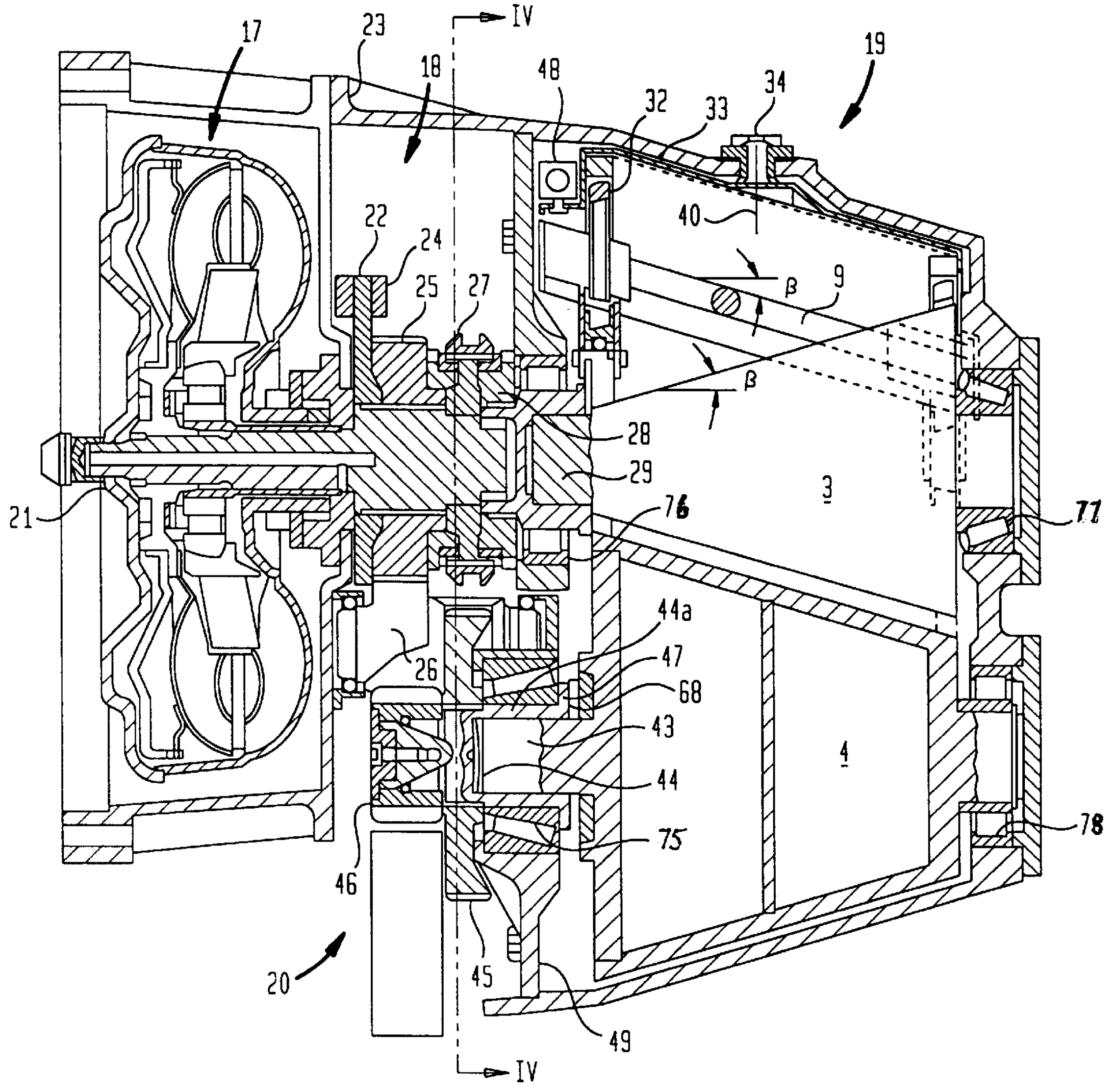
FIG. 3 is a longitudinal section through a front wheel drive of a motor vehicle, having incorporated therein a friction cone gearing according to the present invention.

Turning now to the drawing, and in particular to FIG. 1, there is shown a schematic, partially sectional view of a friction cone gearing according to the present invention, including two bevel wheels 3, 4 which are rotatable in opposite direction to one another about axes 1, 2 in spaced-apart parallel disposition at formation of a gap, and defined by a same taper angle $\beta$ (FIG. 3). Positioned in the gap between the bevel wheels 3, 4 is a friction ring 5 which encircles the bevel wheel 3 and is in contact with both bevel wheels 3, 4. The friction ring 5 is retained in a cage assembly 6 which, as best seen in FIG. 2, is a frame in form of two crossbars 7, 8 in parallel disposition and two spaced apart rods 9, 10 interconnecting the crossbars 7, 8. The rods 9, 10 extend parallel to the axes 1, 2 as well as parallel to the generatrices of the bevel wheels 3, 4, inclined at the angle β and for support of an adjustment bridge 11. On each side, the adjustment bridge 11 includes two inwardly directed pins 12, with each pin 12 having mounted thereon a guide roller 13. Both guide roller 13 are so sized as to engage both sides of the friction ring 5 to provide a required axial guidance.

As shown in FIG. 2, the cage assembly 6 is swingably mounted to a vertical column 14 which is secured to the crossbar 7 and defines a pivot axis about which the cage assembly 6 can rotate, with the pivot axis extending in the plane defined by the pivot axes of the bevel wheels 3, 4. However, it is certainly within the scope of the present invention to orient the pivot axis 14 also in a plane parallel thereto or to intersect the plane defined by the pivot axes of the bevel wheels 3, 4 at an acute angle. A motor 16 is connected to a transversally mounted drive train 15 for operation of the cage assembly 6. A pivoting of the cage assembly 6 by a few angular degrees through activation of the motor 16, causes a pivoting of the friction ring 5 and an axial shift of the adjustment bridge 11 to thereby modify the transmission ratio of the bevel wheels 3, 4, whereby only very slight energy is required to effect this change.

Turning now to FIG. 3, there is shown a longitudinal section through a front wheel drive of a motor vehicle, having incorporated therein a friction cone gearing according to the present invention. The front wheel drive essentially includes a hydraulic converter or hydraulic clutch, generally designated by reference numeral 17, a selector mechanism, generally designated by reference numeral 18 and connected downstream of the hydraulic coupling 17, and a friction cone gearing according to the present invention, generally designated by reference numeral 19 for transmitting power from the engine to an output assembly, generally designated by reference numeral 20. The hydraulic coupling 17, which is of conventional design so that a detailed description thereof is omitted for sake of simplicity, has an output shaft 21 which supports a brake assembly in form of an electronically controlled brake disk 22 which cooperates with brake shoes 24 retained in a housing 23. The selector mechanism 18 includes a freely running gear 25 which is positioned immediately adjoining the brake disk 22 and meshes with a partially illustrated intermediate gear wheel 26 to enable the vehicle to move backwards The gear 25 is formed on one side with a crown toothing for activation through engagement with a selector sleeve 27 which is mounted on the output shaft 21 for axial displacement and is formed with an inner axial toothing.

A reversal of the traveling direction is effected by actuating the brake assembly 22, 24 to halt the drive shaft 29 so as to prevent a torque shock from interfering with operation of the friction cone gearing 19. Then, the selector sleeve 27 is moved, e.g. via a manually operated gear lever, from its neutral position s how n in FIG. 3 to the right for engagement with a pinion 28 which is securely mounted on the drive shaft 29 of bevel wheel 3 of the friction cone gearing 19. Thus, a rotation of the drive shaft 29 is then transmitted from the upper bevel wheel 3 to the output shaft 43 of the lower bevel wheel 4. The change of traveling direction is thus effected via the selector sleeve 27, with the brake assembly 22, 24 stopping the gears 25, 26 to facilitate displacement of the selector sleeve 27.

Figure 3A:
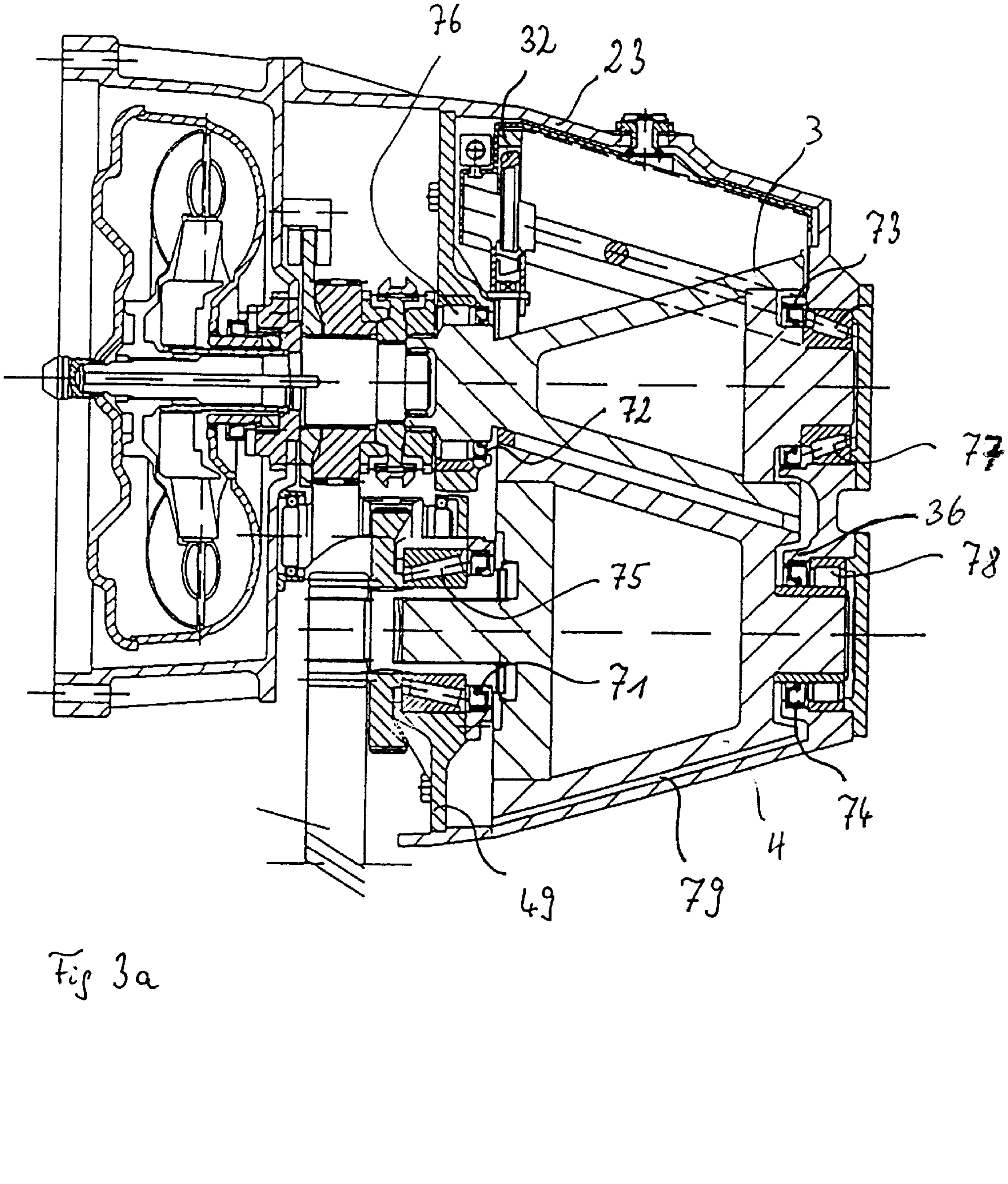
FIG. 3*a* is a longitudinal section through the front wheel drive of the motor vehicle, similar to FIG. 3, with detailed illustration of seals positioned between the bearings for the bevel wheels and the actual transmission zone of the friction cone gearing.

The friction cone gearing 19, shown in FIG. 3, is formed in a same manner as described with respect to FIGS. 1 and 2, and includes the housing 23 accommodating two bevel wheels 3, 4 in radial spaced-apart disposition and rotating in opposite directions about parallel axes defined by a drive shaft 29 on which the upper bevel wheel 3 is se cured and output shaft 43 on which the lower bevel wheel 4 is secured, whereby the drive shaft 29 and the output shaft 43 are supported by suitable journal bearings, such as taper roller bearings 75 and cylindrical roller bearings 76. The opposite ends of the bevel wheels 3, 4 are also supported by suitable journal bearings, such as taper roller bearings 77 and cylindrical roller bearings 78. As shown in FIG. 3*a*, which is another longitudinal section through the front wheel drive of the motor vehicle, similar to FIG. 3, the area of the bearings 75, 76, 77, 78 is separated from the actual bevel wheels 3, 4 by seals 71, 72, 73, 74. The housing 23 is subdivided by a partition 49 which extends on one side of the friction cone gearing 19 and supports the bearings 75, 76, and by a partition 36 which extends on the other side of the friction cone gearing 19 and supports the bearings 77, 78 for the bevel wheels 3, 4. The bearings 75, 76 are sealed from the bevel wheels 3, 4 by seals 71, 72 while the bearings 77, 78 are sealed from the bevel wheels 3, 4 by seals 73, 74 so that an enclosed space 79 is formed in which the actual friction cone gearing 19 is fitted in separate disposition from the bearings 75, 76, 77, 78 and thus from the driving and driven units 17, 18, 20. Thus, a suitable traction fluid can be used as coolant in the space 79. Arranged on the friction cone gearing distal sides of the seals 75, 76, 77, 78 are the bearings 75, 76, 77, 78 which are lubricated by a suitable lubricant.

The bevel wheels 3, 4 are defined by a same taper angle β, with the upper bevel wheel 3 being encircled by a friction ring 32 having an inner peripheral surface in frictional engagement with the bevel wheel 3 and outer peripheral surface in frictional engagement with the bevel wheel 4. The bevel wheels 3, 4 are suitably sealed against the housing 23, with lubrication of the bevel wheels 3, 4 and the friction ring 32 being effected through a separate lubricant circulation The bevel wheels 3, 4 may exhibit different diameters, as shown in FIG. 3, to thereby optionally save a transmission stage of the subsequent output 20. For weight reasons, the bevel wheels 3, 4 may be hollow.

Figure 4:
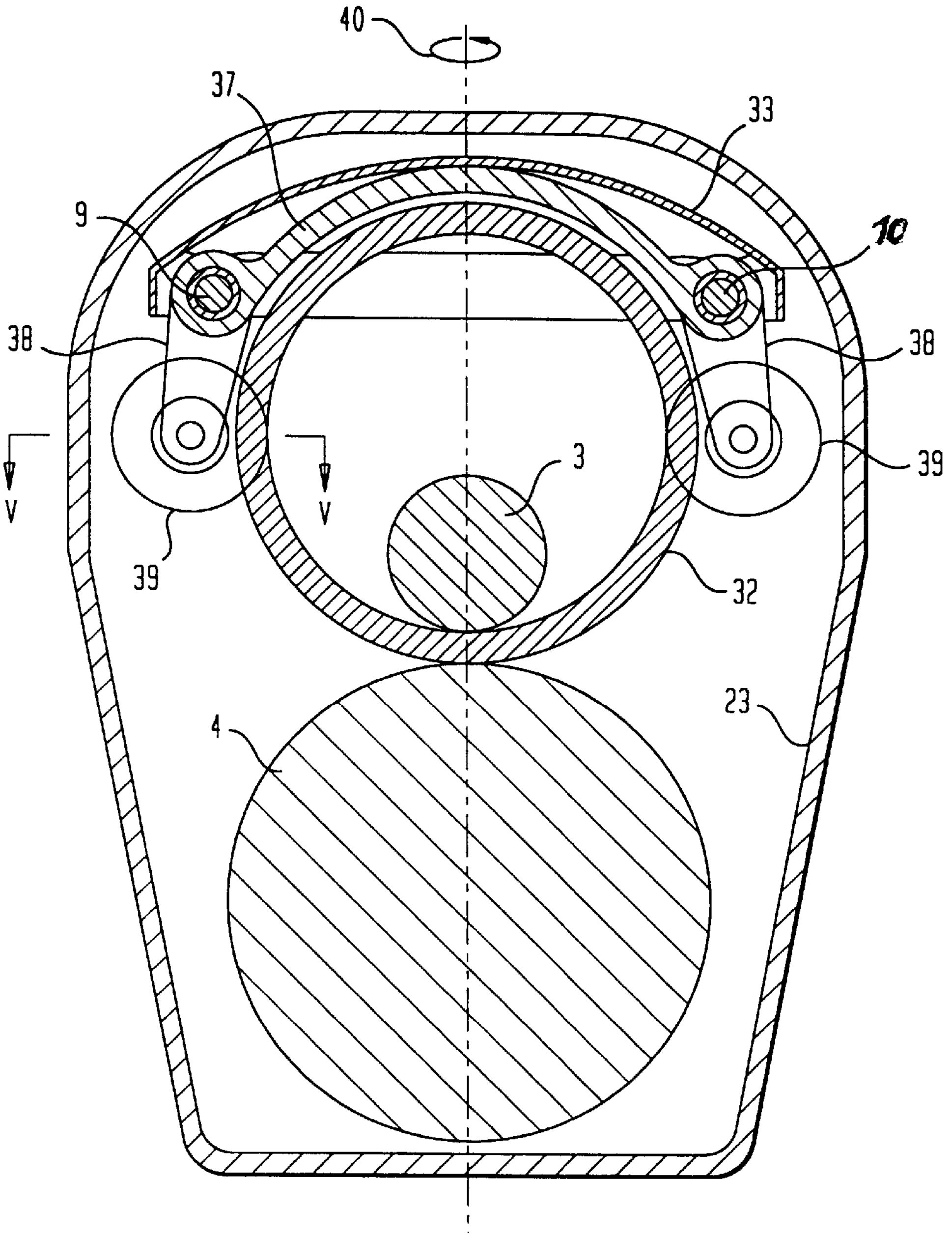
FIG. 4 is a sectional view of the friction cone gearing of FIG. 3, taken along the line IV—IV in FIG. 3.

As shown in FIG. 4, the friction ring 32 is retained in a cage assembly 33 which is swingably mounted to the housing 23 at location 34 for rotation about a pivot axis 40 which extends in a plane determined by the pivot axes of the bevel wheels 3, 4. In order to prevent great swinging ranges, the pivot axis 40 is disposed approximately in a mid-section of the axial dimension of the housing 23. It is noted however, that the pivot axis 40 may also be oriented, as described above, in a plane parallel thereto or intersect the plane defined by the pivot axes of the bevel wheels 3, 4 at an acute angle.

Figure 5:
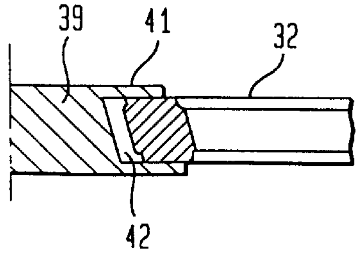
FIG. 5 is a cutaway sectional view, taken along the line V—V in FIG. 3.

The cage assembly 33 is formed by a frame comprised of two rods 9, 10 extending parallel to one another at an inclination corresponding to the taper angle β of the bevel wheels 3, 4. The rods 9, 10 support an adjustment bridge 37 having mounts 38 (FIG. 4) for attachment of guide rollers 39. As shown in FIG. 5 the guide rollers 39 are formed with a peripheral track 41 which is flanked by opposite flanges 42 to exhibit a forked configuration for engagement by the friction ring 32.

The friction ring 32 is pivotable about a rotational axis which is parallel to the pivot axes of the bevel wheels 3, 4. It is however also conceivable to so secure the friction ring 32 in the cage assembly 33 that the rotational axis of the friction ring 32 is oriented parallel to the generatrix of the facing bevel wheels 3, 4 and thus perpendicular to the outer surface area of the bevel wheels 3, 4.

The adjustment of the cage assembly 33 is effected through operation of an adjustment spindle 48 which is supported in the housing 23. The spindle 48 is operatively connected to a motor or magnet (not shown) and is in engagement with the cage assembly 33, as schematically indicated in FIG. 3. A slight turning of the cage assembly 33 by means of the spindle 48 turns the friction ring 32 about the pivot axis 40, thereby modifying the relative position thereof to the bevel wheels 3, 4. Thus, the position of the friction ring 32 is automatically changed to alter the transmission ratio of the friction cone gearing 19.

As further shown in FIG. 3, the output shaft 43 of the bevel wheel 4 is received in a pressure-application unit 44 which is supported in the housing 23 and carries output pinions 45, 46. The pressure application unit 44 includes an extension shaft 44*a* placed over the adjacent end of the output shaft 43 and formed with a flange 47 facing the bevel wheel 4 and having a radial toothing 68 for coaction with a complementary radial toothing of the bevel wheel 4. Through the provision of the radial toothing 68, an axial pressure is exerted onto the bevel wheel 4 upon application of a torque, whereby the axial pressure increases with increasing torque.

As described above, the housing 23 is compartmentalized by partitions 49, 36, with one compartment accommodating the hydraulic coupling 17, selector mechanism 18 and output shaft 20, and with another compartment accommodating the friction cone gearing 19. Thus, it is possible, to conduct a coolant without lubricating qualities, e.g. silicone oil, into the compartment that accommodates the friction cone gearing 19 so that the friction value is not adversely affected. Other examples for use as coolant in the friction cone gearing include traction fluids or oil containing ceramic powder or other solid particles.

Suitably, the friction surfaces of at least one component of the friction cone gearing, e.g. the bevel wheels 3, 4 or the friction ring 32, are coated by a layer of hard metal or ceramics, e.g. of titanium nitride, titanium carbon nitride and titanium aluminum nitride or the like.

Figure 6:
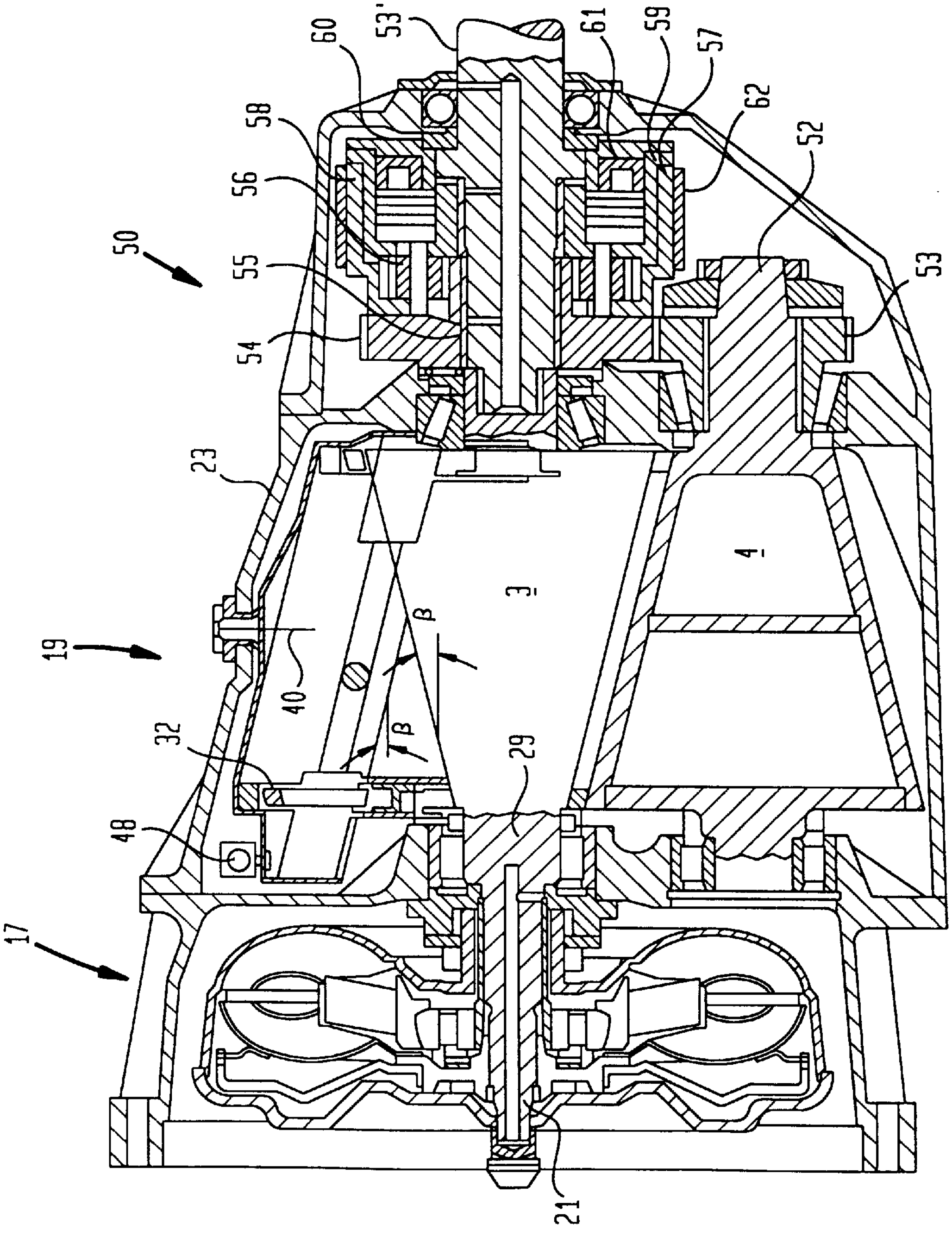
FIG. 6 is a longitudinal section through a rear wheel drive of a motor vehicle, having incorporated therein a friction cone gearing according to the present invention.

Turning now to FIG. 6, there is shown a longitudinal section through a rear wheel drive of a motor vehicle, having incorporated therein a friction cone gearing 19 according to the present invention. Parts corresponding with those in FIG. 3 are denoted by identical reference numerals and not explained again. Disposed upstream of the friction cone gearing 19 is the hydraulic converter or hydraulic coupling 17, while a planetary gear train, generally designated by reference numeral 50 is positioned downstream the friction cone gearing 19. The output shaft 21 of the hydraulic coupling 17 is formed in one piece with the drive shaft 29 of the upper bevel wheel 3 which drives the lower bevel wheel 4 via the interposed friction ring 32. The bevel wheel 4 has an output shaft 52 which carries a pinion 53 in mesh with a freely rotatable gear 54 that is mounted on an output shaft 53' of the transmission. The output shaft 53' is in alignment with the drive shaft 29 and freely rotatable received therein.

A pinion 55 is formed in one piece with the gear 54 to form the sun wheel of the planetary gear train 50. The pinion 55 meshes with planet gears 56 retained in a planet carrier 57 which is capable of running about the output shaft 53'. The planet carrier 57 is formed with a cylindrical protrusion 58 for supporting a hollow annulus 59 which is in mesh with the planet gears 56 and securely fixed to the output shaft 53' via an axial toothing 60.

The planetary gear train 50 further includes a multi-disk clutch 61 which is able to connect the output shaft 53' with the annulus 59. Further, a brake assembly 62 is attached to the cylindrical protrusion 58 of the planet carrier 54. Operation of the multi-disk clutch 61 commences the front drive. When actuating the brake assembly 62, the planet carrier 57 is held in place, allowing a change of the rotation direction of the output shaft 53' of the transmission, and thus reversal of the traveling direction.

FIG. 6 further shows that, the opposite ends of the bevel wheels 3, 4 are supported by journal bearings, such as cylindrical roller bearings 85, 86 and taper roller bearings 87, 88, which are sealed from the bevel wheels 3, 4 by seals 80, 81, 83 so that an enclosed space 84 is formed in which the actual friction cone gearing 19 is fitted in separate disposition from the bearings 85, 86, 87, 88 and thus from the driving and driven units. Thus, a suitable traction fluid can be used as coolant in the space 84.

While the invention has been illustrated and described as embodied in a friction cone gearing, it is not intended to be limited to the details shown since various modifications and structural changes may be made without departing in any way from the spirit of the present invention.

What is claimed as new and desired to be protected by Letters Patent is set forth in the appended claims:

1. A friction cone gearing assembly for transmitting power from a driving unit to a driven unit, comprising:

a housing being subdivided into compartments;

a friction cone gearing including a first bevel wheel rotatable about a first rotational axis and defined by a taper angle, a second bevel wheel rotatable about a second rotational axis in parallel disposition to the first rotational axis, and defined by a taper angle which is identical to the taper angle of the first bevel wheel, and a friction ring operatively engaged with the first and second bevel wheels and circumscribing one of the bevel wheels, said friction ring being guided along a generatrix of both bevel wheels;

bearing means for supporting opposite ends of the bevel wheel in the housing;

said friction cone gearing being accommodated in one of the compartments of the housing separate from the compartments accommodating the bearing means, the driving unit and driven unit; wherein different lubricants are use in each of the compartments.

2. In combination:

a friction cone gearing assembly according to claim 1;

a transmission for a rear wheel drive of a type having a hydraulic clutch, an output shaft, and a planetary gear train interposed between the hydraulic clutch and the output shaft and including a sun wheel, a planet carrier, planet gears retained by the planet carrier, and an annulus coacting with the planet gears and operatively connected to the output shaft of the transmission;

a brake assembly so configured as to act on the planet carrier for influencing a traveling direction; and a clutch assembly positioned between the annulus and the output shaft.

3. The gearing assembly of claim 1 wherein the bearing means for the bevel wheels are sealingly separated from the friction cone gearing.

4. The gearing assembly of claim 1 wherein the friction cone gearing includes a cooling system with a coolant having contained therein solid particles for generating a high friction value between the first and second bevel wheels.

5. The gearing assembly of claim 1 wherein the coolant is air.

6. The gearing assembly of claim 1 wherein the bevel wheels have ceramic surfaces.

7. The gearing assembly of claim 1 wherein at least one element selected from the group consisting of first bevel wheel, second bevel wheel and friction ring, has a coating of a material selected from the group consisting of hard metal and ceramics.

8. The gearing assembly of claim 7 wherein the at least one element is made of titanium nitride, titanium carbon nitride and titanium aluminum nitride.

9. The gearing of claim 1 wherein the first and second bevel wheels are of hollow configuration.

10. The gearing assembly of claim 1 wherein the first and second bevel wheels have different mean diameters.

11. The gearing assembly of claim 1 and further comprising partition means for subdividing the housing into compartments, with the friction cone gearing accommodated in one compartment for separation from the driving unit and driven unit to thereby separate a friction zone between the friction ring and the bevel wheels from the bearing means of the bevel wheels.

12. In combination:

a friction cone gearing assembly according to claim 1;

a transmission for a front wheel drive of a type having a hydraulic clutch, a selector mechanism for changing a traveling direction of the gearing and an output part secured to the gearing; and an electrically activated, fixed brake assembly mounted between the hydraulic clutch and the selector mechanism for allowing effective operation of the output part of the transmission.

* * * * *